US012385629B1

(12) United States Patent
Zheng

(10) Patent No.: US 12,385,629 B1
(45) Date of Patent: Aug. 12, 2025

(54) LIGHTING DEVICE

(71) Applicant: JOININ GLOBAL PTE.LTD., Singapore (SG)

(72) Inventor: Hongbing Zheng, Hangzhou (CN)

(73) Assignee: JOININ GLOBAL PTE.LTD., Singapore (SG)

( * ) Notice: Subject to any disclaimer, the term of this patent is extended or adjusted under 35 U.S.C. 154(b) by 0 days.

(21) Appl. No.: 18/884,051

(22) Filed: Sep. 12, 2024

(30) Foreign Application Priority Data

Jul. 22, 2024 (CN) ......................... 202421740003.4

(51) Int. Cl.

| | |
|---|---|
| ***F21S 9/03*** | (2006.01) |
| ***F21V 17/16*** | (2006.01) |
| ***F21V 21/08*** | (2006.01) |
| ***F21V 23/00*** | (2015.01) |
| ***F21V 31/00*** | (2006.01) |
| *F21Y 103/00* | (2016.01) |

(52) U.S. Cl.

CPC .............. *F21V 21/08* (2013.01); *F21S 9/037* (2013.01); *F21V 17/164* (2013.01); *F21V 23/002* (2013.01); *F21V 31/005* (2013.01); *F21Y 2103/00* (2013.01)

(58) Field of Classification Search
None
See application file for complete search history.

(56) References Cited

U.S. PATENT DOCUMENTS

2007/0091594 A1* 4/2007 Soon ......................... F21L 4/00 362/183

* cited by examiner

*Primary Examiner* — Sean P Gramling
(74) *Attorney, Agent, or Firm* — IPRTOP LLC

(57) ABSTRACT

A lighting device includes a lamp holder, a light source cover, and a light strip. The lamp holder includes an upper housing and a lower housing, where the upper housing is adapted to the lower housing, and the upper housing and the lower housing are fixed together to form an accommodating chamber. The bottom of the lower housing is provided with a through hole. The light source cover is detachably connected to the lamp holder through the through hole. One end of the light strip is connected to a circuit board, which is housed within the accommodating chamber, while the other end of the light strip extends through the through hole into the interior of the light source cover. This lighting device addresses issues related to the limited installation scenarios of solar string lights, the complexity of the installation process, high costs, and insufficient cable strength.

7 Claims, 6 Drawing Sheets

LIGHTING DEVICE

FIELD OF THE INVENTION

The present disclosure belongs to the field of lighting technology, and in particular, relates to a lighting device.

BACKGROUND OF THE INVENTION

As an eco-friendly and aesthetically pleasing lighting fixture, LED solar string lights have been widely adopted in people's daily lives, particularly for holiday decorations, landscape arrangements, and outdoor activities. However, despite their advantages of energy efficiency and ease of installation, these lights still face several limitations and issues that hinder their broader application and installation efficiency.

For example, most LED solar string lights are designed for specific occasions only, such as holiday decorations or garden lighting. As a result, they are often unsuitable for use in more complex or variable environments, such as in high-wind areas or frequently moving locations, limiting their versatility and range of applications.

Additionally, traditional LED solar string lights are typically connected to the cable through a complex method, which not only increases the complexity of the manufacturing process but also raises the overall cost. This complex connection method may require professional installers, thereby increasing the cost for users and making it inconvenient for consumers to install and maintain the string lights by themselves.

Moreover, since LED solar string lights are often used outdoors, their cables need to be strong enough to withstand adverse weather conditions and physical damage. However, the cables of existing LED solar string lights often lack sufficient strength and are prone to breaking, which forces installers to use additional steel wires to reinforce the support, thereby further increasing the complexity and cost of installation.

In summary, providing a lighting device that addresses the aforementioned issues has become a pressing technical challenge for professionals in the field.

SUMMARY OF THE INVENTION

The present disclosure provides a lighting device. This lighting device addresses issues related to the limited installation scenarios of solar string lights, the complexity of the installation process, high costs, and insufficient cable strength.

The lighting device comprises a lamp holder, a light source cover, and a light string.

The lamp holder comprises an upper housing and a lower housing, the upper housing is adapted to the lower housing, and the upper housing and the lower housing are fixed together to form an accommodating chamber; wherein the lower housing is provided with a through hole at its bottom.

The light source cover is detachably connected to the lamp holder through the through hole.

A first end of the light strip is connected to a circuit board, and a second end of the light strip extends through the through hole into the interior of the light source cover; wherein the circuit board is housed within the accommodating chamber.

In an embodiment of the present disclosure, the opening of the light strip is provided with a first buckle structure, which is adapted to a second buckle structure located at the inner surface of the through hole. The first buckle structure and the second buckle structure form a snap-fit connection.

In an embodiment of the present disclosure, the lighting device further comprises a solar panel and a control module.

The solar panel is fixed in the top portion of the upper housing.

The control module is fixed in the accommodating chamber and is electrically connected to the solar panel and the circuit board.

In an embodiment of the present disclosure, the upper housing comprises an upper chamber and a lower chamber.

The upper chamber is provided with a wire outlet hole, which is used for leading out wires of the solar panel.

The lower chamber is provided with a battery compartment and an upper-lower-chamber internally threaded column, the battery compartment is used to accommodate a battery and is connected to the control module, and the upper-lower-chamber internally threaded column is used to secure the upper and lower housings together.

In an embodiment of the present disclosure, the inner surface at the edge of the lower chamber is provided with a downward double-step structure, wherein an upper step of the double-step structure is wider than a lower step of the double-step structure.

In an embodiment of the present disclosure, the side surface of the upper housing is provided with a first mounting hole, and the first mounting hole is used for hanging the lighting device on an external structure.

In an embodiment of the present disclosure, the side surface of the upper housing is provided with at least two hanging holes, and the at least two hanging holes are used in conjunction with a mounting hole for hanging the lighting device using a hook.

In an embodiment of the present disclosure, the lower housing comprises a positioning structure, a second mounting hole, a drain hole, and a switch hole.

The positioning structure comprises an upper-lower-housing internally threaded column, a battery-positioning internally threaded column, a control-module internally threaded column, and a circuit-board internally threaded column; wherein the upper-lower-housing internally threaded column is used to secure the upper and lower housings together, the battery-positioning internally threaded column is used to secure the battery, the control-module internally threaded column is used to secure the control module, and the circuit-board internally threaded column is used to secure the circuit board.

The second mounting hole is adapted to the first mounting hole for further installation of additional components.

The drain hole is located below the second mounting hole and features a conical structure that is narrower at the top and wider at the bottom.

The switch hole is positioned near the through hole and is used for installing a switch and operating it through the switch hole.

In an embodiment of the present disclosure, the lower part of the drain hole is provided with at least one drainage channel, which is used to direct liquid that enters from the mounting hole to the exterior of the lighting device, preventing moisture accumulation that could damage the electronic components.

In an embodiment of the present disclosure, a sealing device is provided along the circumference of the switch hole, wherein the sealing device comprises one or more of a rubber gasket and waterproof sealing adhesive to prevent moisture from entering the accommodating chamber through the switch hole.

In an embodiment of the present disclosure, the electrical connection between the circuit board and the control module is detachable.

In an embodiment of the present disclosure, the circuit board is electrically connected to the control module through methods such as riveting, welding, or male and female terminals.

As described above, the lighting device provided by the present disclosure has the following beneficial effects.

1. Waterproof and dustproof: The tight fit between the upper and lower housings, together with the use of sealing rings or gaskets, effectively enhances the waterproof and dustproof performance of the lighting device.

2. Ease of maintenance and replacement: the detachable connection between the circuit board and the control module allows for quick repairs or replacement of elements in the event of a malfunction, without the need to replace the entire system. This reduces maintenance costs and extends the product's lifespan.

3. Structural stability and installation flexibility: the double-step structure of the lower chamber and the rational distribution of hanging holes enhance the overall structural stability while providing flexible installation options to adapt to different environments.

4. Anti-water-accumulation design: the semi-enclosed structure of the mounting hole and the drain hole below effectively prevent the entry and accumulation of moisture, protecting the internal electronic components from damage, and making the lighting device particularly suitable for outdoor and humid environments.

5. User-friendly operation interface: the arrangement of the switch hole allows users to operate the switch without disassembling the product, enhancing convenience as well as the waterproof and dustproof performance of the device.

6. Component independence: the independent design of the light source cover, light strip, and circuit board reduces the risk of damage to internal components due to improper operation, while also facilitating the independent replacement and maintenance of each component.

In summary, the lighting device of the present disclosure not only provides excellent protective performance but also offers ease of maintenance, simple operation, and structural stability, making it suitable for a wide range of indoor and outdoor lighting environments.

REFERENCE NUMERALS

Figure 1:
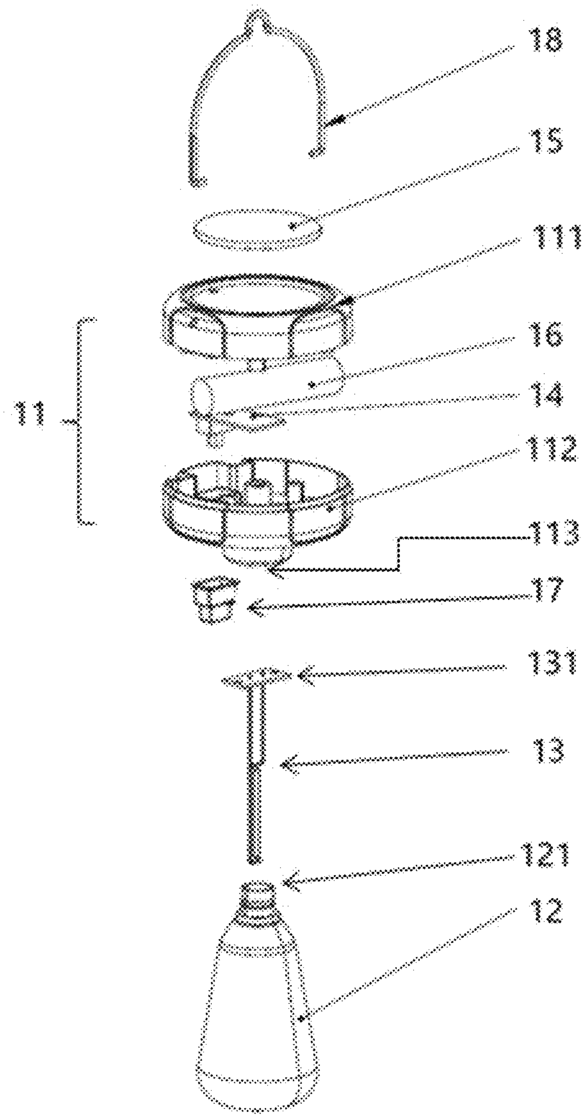
FIG. 1 shows an exploded view of a lighting device according to an embodiment of the present disclosure.

11 Lamp holder
12 Light source cover
13 Light strip
14 Control module
15 Solar panel
16 Battery
17 Switch
18 Hook
111 Upper housing
112 Lower housing
113 Through hole
121 First buckle structure
131 Circuit board
21 Second buckle structure
31 Upper chamber
311 Wire outlet hole
312 First mounting hole
313 Hanging hole
41 Lower chamber
411 Battery compartment
412 Upper-lower-chamber internally threaded column
413 Double-step structure
51 Positioning structure
511 Upper-lower-housing internally threaded column
512 Battery-positioning internally threaded column
513 Control-module internally threaded column
514 Circuit-board internally threaded column
52 Second mounting hole
53 Drain hole
54 Switch hole

DETAILED DESCRIPTION OF THE INVENTION

The following specific examples illustrate the embodiments of the present disclosure. Those skilled in the art can easily understand other advantages and effects of the present disclosure based on the content disclosed in the present disclosure. The present disclosure can also be implemented or applied through other different specific embodiments. The details in this specification may also be modified or changed in various ways based on different perspectives and applications, without departing from the spirit of the present disclosure. It should be noted that, where there is no conflict, the following embodiments and the features within these embodiments can be combined with each other.

It should also be noted that the illustrations provided in the following embodiments are intended to illustrate the basic concept of the present disclosure schematically. Therefore, the figures only show components relevant to the present disclosure and are not drawn to the actual number, shape, or size of components as they would be implemented. The types, number, and proportions of components in actual implementation can be arbitrarily changed, and the layout of components may also be more complex.

The embodiments provided in the present disclosure offer a lighting device that has a wide range of applications, simple and inexpensive connection processes, sufficient cable strength, and no need for auxiliary steel cables during installation.

The principles and implementation methods of the lighting device in this embodiment will be detailed below in conjunction with the accompanying drawings, allowing those skilled in the art to understand the lighting device of this embodiment easily.

FIG. 1 shows an exploded view of a lighting device according to an embodiment of the present disclosure. As shown in FIG. 1, the present disclosure provides a lighting device, which includes a lamp holder 11, a light source cover 12, and a light strip 13.

The lamp holder 11 includes an upper housing 111 and a lower housing 112, where the upper housing 111 is adapted to the lower housing 112 and can be fixed together with the lower housing 112 to form an accommodating chamber. The bottom of the lower housing 112 is provided with a through hole 113.

The light source cover 12 is detachably connected to the lamp holder 11 through the through hole 113 at the bottom of the lower housing 112.

One end of the light strip 13 is connected to a circuit board 131, which is housed within the accommodating chamber, while the other end of the light strip 13 extends through the through hole 113 into the interior of the light source cover 12.

The upper housing and lower housing of the lamp holder are adapted to each other (e.g., their shapes and structures are so configured that they can be engaged with each other) and may be fixed together through threading, buckle mechanism, adhesion, or other mechanical connection methods to form the accommodating chamber. The accommodating chamber, formed by the upper and lower housings when fixed together, is a sealed space used to accommodate and protect internal electronic components, preventing dust, moisture, and other external factors. The design of the accommodating chamber takes into account air circulation to facilitate internal heat dissipation, ensuring the normal operation of the electronic components and extending their lifespan. A sealing ring or gasket is provided at the junction of the upper and lower housings to enhance the overall waterproof and dustproof performance. Furthermore, a breathing hole or membrane is used to allow for a certain degree of pressure balance without compromising the sealing design, for example, to prevent deformation of the housing due to pressure changes.

Additionally, the lighting device also includes a solar panel 15 and a control module 14.

The solar panel 15 is fixed at the top of the upper housing 111.

The control module 14 is fixed inside the accommodating chamber and is electrically connected to the solar panel 15 and the circuit board 131.

Moreover, the electrical connection between the circuit board 131 and the control module 14 is detachable connection. For example, the circuit board 131 may be electrically connected to the control module 14 through riveting, welding, or male and female terminals. This detachably electrical connection facilitates maintenance and replacement; if the light strip or control module malfunctions, they can be easily repaired or replaced individually without replacing the entire system. At the same time, as technology advances, it may be necessary to upgrade the control module to support new functions or improve performance, in which case the detachable connection will make the upgrade process simpler, requiring only the replacement of the control module 14.

Figure 2:
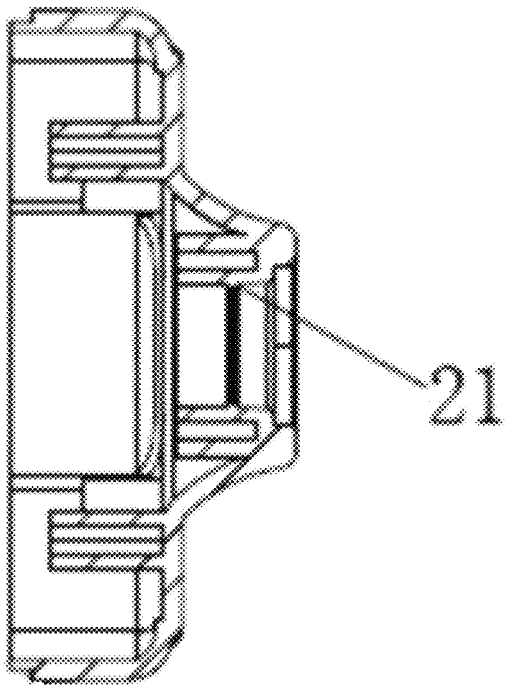
FIG. 2 shows a schematic diagram of a buckle structure of the lighting device according to an embodiment of the present disclosure.

Please refer to FIGS. 1 to 5. FIG. 2 shows a schematic diagram of a buckle structure of the lighting device according to the present disclosure, and FIG. 5 shows a schematic diagram of the lower housing of the lighting device according to the present disclosure. As shown in FIGS. 2 and 5, the open end of the light source cover 12 is provided with a first buckle structure 121, which is adapted to the second buckle structure 21 on the inner surface of the through hole 113 to achieve a snap-fit connection. The bottom of the lower housing 112 is provided with the through hole 113, and the light source cover 12 is detachably connected to the lamp holder 11 through the through hole 113 at the bottom of the lower housing 112.

Figure 6:
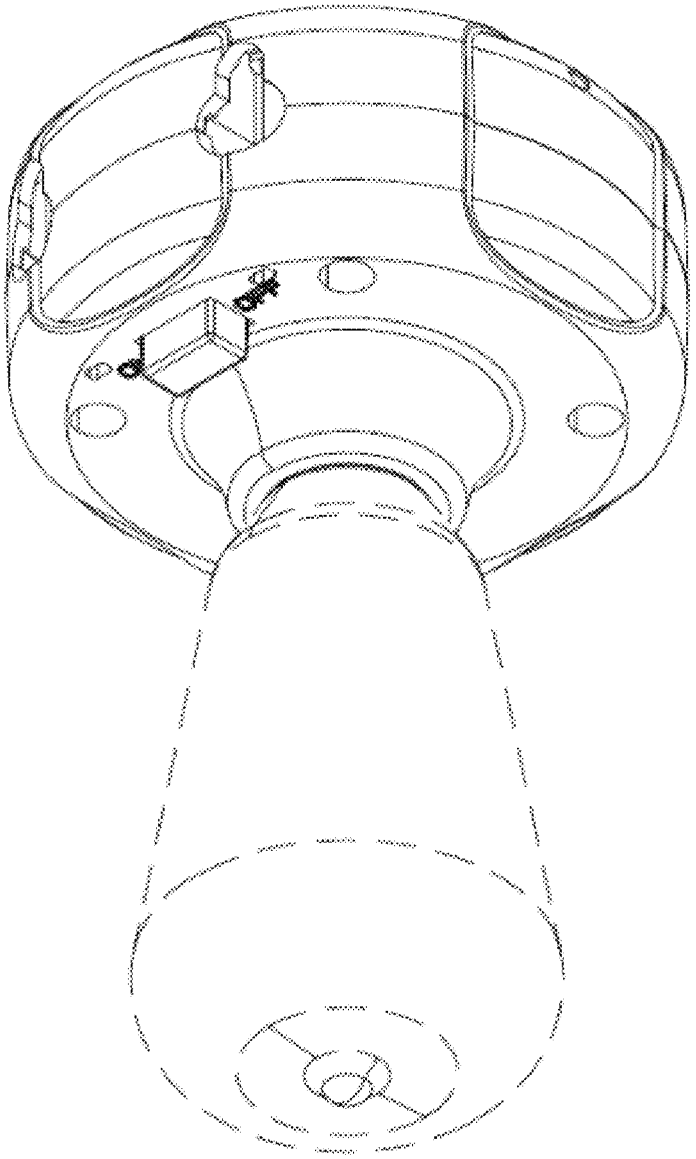
FIG. 6 shows an axonometric view of the lighting device according to an embodiment of the present disclosure.

Please refer to FIG. 6, which shows an axonometric view of the lighting device according to the embodiment of the present disclosure. The top of the light source cover 12 is provided with the first buckle structure 121, which matches the second buckle structure 21 on the inner surface (the wall recesses to form grooves to adapt to the first buckle structure 121) of the through hole 113 of the lower housing. When the first buckle structure 121 at the top of the light source cover 12 is aligned with and pressed against the second buckle structure 21 of the lower housing 112, the buckle of the first buckle structure 121, due to its elasticity, snaps into the groove of the second buckle structure 21 and is secured by its barb or locking edge, thereby achieving a fixed connection between the light source cover 12 and the lower housing 112. This design allows the light source cover to be connected to and detached from the lamp holder through a simple "click" operation, without the need for tools, making it easy for users to disassemble and install. Furthermore, since the light source cover, the light strip, and the circuit board are independent (i.e., the light source cover, the light strip, and the circuit board can be operated separately), the rotation of the light source cover does not cause the light strip to rotate. This indicates that the snap-fit connection allows the light source cover to move freely within a certain range without interfering with the internal electronic components, particularly the light strip. This design can reduce the likelihood of damage to internal components due to improper operation.

Figure 3:
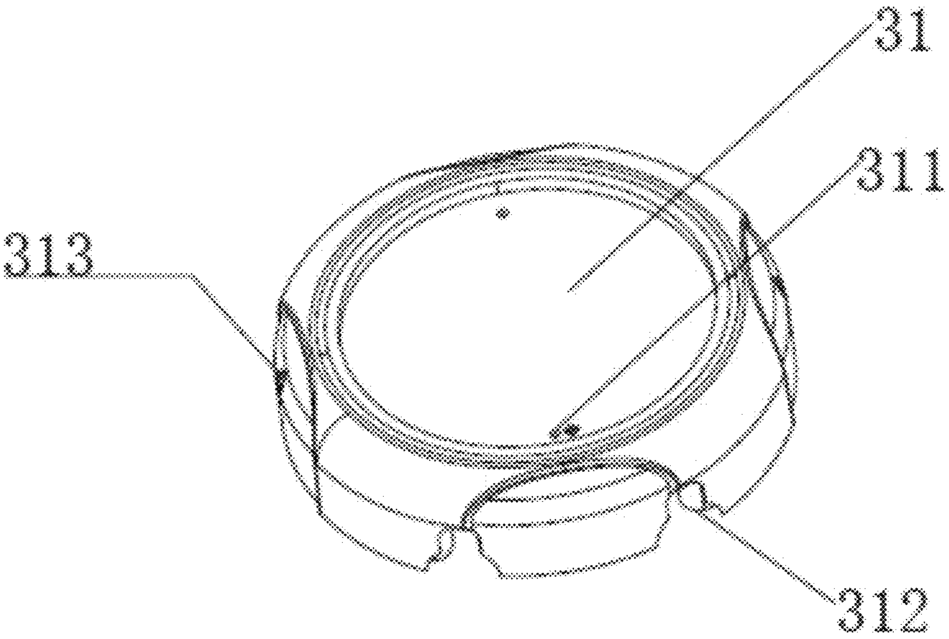
FIG. 3 shows a schematic diagram of an upper chamber of an upper housing of the lighting device according to an embodiment of the present disclosure.
Figure 4:
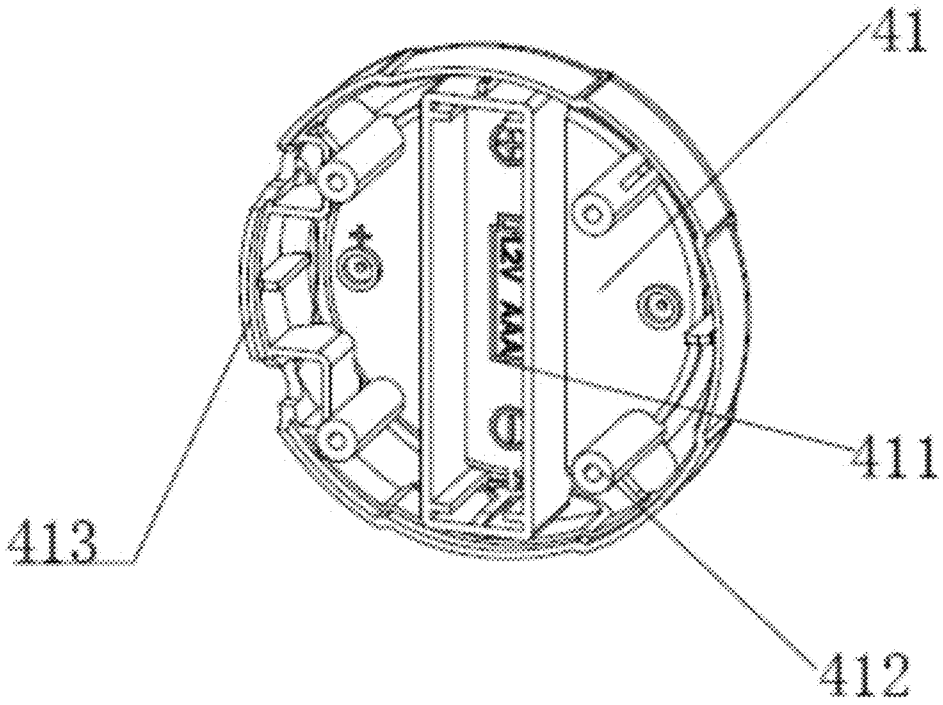
FIG. 4 shows a schematic diagram of a lower chamber of the upper housing of the lighting device according to an embodiment of the present disclosure.

Please refer to FIGS. 3 and 4, which show schematic diagrams of an upper chamber and a lower chamber of the upper housing of the lighting device according to the present disclosure. As shown in the figures, the upper housing 111 includes an upper chamber 31 and a lower chamber 41.

The upper chamber 31 is provided with a wire outlet hole 311, which is used to lead out the wires of the solar panel 15 and connect them to the control module 14.

The lower chamber 41 is provided with a battery compartment 411 and an upper-lower-chamber internally threaded column 412. The battery compartment 411 is used to accommodate the battery 16 and connect it to the control module 14, while the upper-lower-chamber internally threaded column 412 is used to fix the upper and lower housings together. The edge of the inner surface of the lower chamber 41 is provided with a downward double-step structure 413, whose upper step is wider than its lower step.

Specifically, the width of the upper step is greater than that of the lower step. This double-step design increases the rigidity and structural stability of the lower chamber, especially when the upper housing 111 and the lower housing 112 are connected. The wider upper step provides a broader support area, ensuring an even distribution of force and reducing the risk of deformation or damage due to external forces.

As shown in FIG. 3, one side of the upper housing 111 is provided with a first mounting hole 312, which is used for hanging the lighting device on an external structure. At least two hanging holes 313 are provided along the edge of the upper housing 111, which work in conjunction with the mounting hole for hanging the lighting device using hooks. Furthermore, the mounting hole has a semi-enclosed structure.

In one embodiment, the first mounting hole on one side of the upper housing is positioned at the center of the outer surface of the upper housing to maintain the balance of the lighting device when hung. The mounting hole has a semi-enclosed structure, effectively preventing moisture from directly entering the device. This semi-enclosed structure serves as a physical barrier and uses gravity to ensure that even if water splashes onto the device, it is difficult for the water to enter through the mounting hole, thereby protecting the internal electronic components from water damage. This is particularly important for solar string lights used outdoors, as they are often exposed to variable weather conditions. The semi-enclosed mounting hole also reduces the ingress of dust and small particles (such as insects) into the device. This not only helps to maintain the cleanliness of the interior, extending the device's lifespan, but also prevents issues such as circuit shorts caused by insect intrusion. The semi-enclosed mounting hole also reduces safety hazards during use. For example, it can prevent a child's fingers or other objects from accidentally inserting into the power hole, thereby avoiding the risk of electric shock.

At least two hanging holes are provided, positioned on two sides of the edge of the upper housing, to offer stable hanging points. The hanging holes on two sides of the edge of the upper housing are slot-shaped or oval, accommodating the inserted hooks, providing more hanging options and enhancing flexibility and adaptability. The hanging holes are provided with inserts made of elastic materials (such as rubber or silicone), which can be compressed to fit hooks of different diameters and provide anti-slipping functionality. The position of the hanging holes works in conjunction with that of the first mounting hole to ensure the stability of the lighting device when hung. Furthermore, one end of the hook is inserted into the hanging hole, and the other end of the hook is fixed to an external structure. The hook can be quickly connected and disconnected from the hanging hole through a buckle or twist-lock mechanism.

Figure 5A:
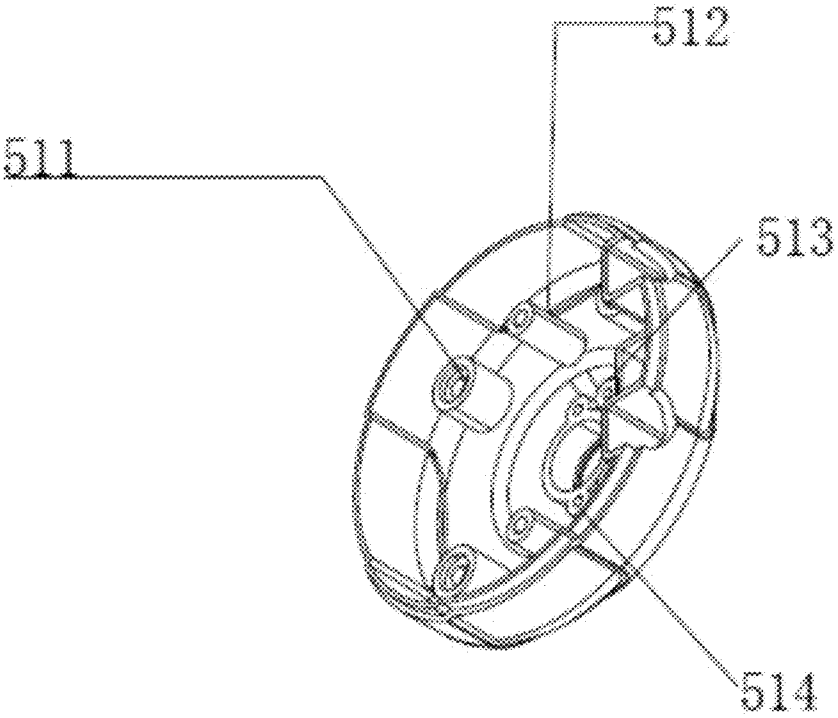
FIG. 5*a* shows a schematic diagram of a positioning structure of a lower housing of the lighting device according to an embodiment of the present disclosure.
Figure 5B:
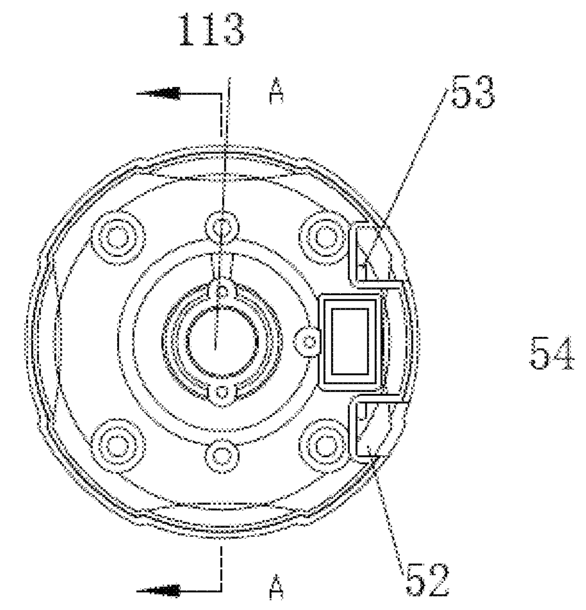
FIG. 5*b* shows a bottom view of the lower housing of the lighting device according to an embodiment of the present disclosure.
Figure 5C:
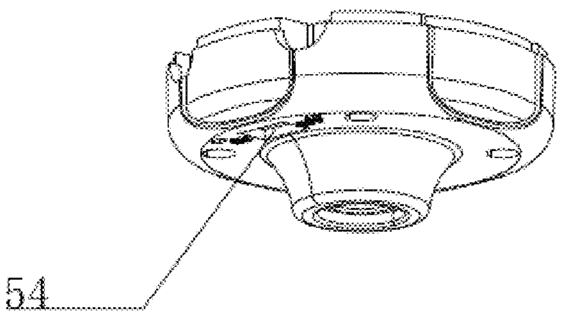
FIG. 5*c* shows a schematic diagram of a switch hole of the lower housing of the lighting device according to an embodiment of the present disclosure.

Please refer to FIGS. 5*a*, 5*b*, and 5*c*. FIG. 5*a* shows a schematic diagram of a positioning structure of the lower housing of the lighting device. FIG. 5*b* shows a bottom view of the lower housing of the lighting device. The lower housing includes a positioning structure 51, a second mounting hole 52, a drain hole 53, and a switch hole 54.

The positioning structure 51 includes an upper-lower-housing internally threaded column 511, a battery-positioning internally threaded column 512, a control-module internally threaded column 513, and a circuit-board internally threaded column 514. The upper-lower-housing internally threaded column 511 is used to secure the upper and lower housings, the battery-positioning internally threaded column 512 is used to secure the battery 16, the control-module internally threaded column 513 is used to secure the control module 14, and the circuit-board internally threaded column 514 is used to secure the circuit board 131.

The second mounting hole 52 is adapted to the first mounting hole 312 for the installation of additional components.

A bottom of the drain hole 53 is located below a bottom of the second mounting hole 52, and the drain hole 53 has a conical (or conical-like) structure that is narrower at the top and wider at the bottom.

The switch hole 54 is positioned near the through hole 113 and is used to install a switch that can be operated through the switch hole 54.

The lower part of the drain hole 53 is provided with at least one drainage channel connecting the drain hole 53 and the second mounting hole 52, configured to direct any liquid entering from the second mounting hole 52 to the exterior of the lighting device, thereby preventing moisture accumulation that could damage the electronic components.

Specifically, for lighting devices, especially those used in outdoor or humid environments, the drain hole is typically located below the mounting hole, so that gravity is utilized to ensure that any liquid entering from the mounting hole naturally flows toward the drain hole. The conical structure, being narrower at the top and wider at the bottom, helps guide the liquid downward and prevents it from accumulating at the top of the drain hole, thereby reducing potential threats to the electronic components. The lower part of the drain hole is provided with at least one drainage channel, which serves as an outlet for the liquid, effectively guiding it outside the lighting device to prevent moisture from accumulating inside the lighting device. The primary function of the drain hole and drainage channel is waterproof protection. When liquid accidentally enters from the mounting hole, these designs quickly drain the liquid, significantly reducing the risk of short circuits or corrosion caused by moisture accumulation. By effectively removing moisture, the drain hole and drainage channel enhance the stability and lifespan of the lighting device in humid or outdoor environments. Additionally, the likelihood of equipment failure due to moisture is reduced, thereby lowering maintenance costs and frequency. This is particularly important for lighting devices installed outdoors or at high altitudes where regular maintenance is difficult.

Please refer to FIG. 5*c*, which shows a schematic diagram of the switch hole of the lower housing of the lighting device of the present disclosure. As shown in FIG. 5*c*, the switch hole 54 is located on the outer part of the bottom surface of the lower housing 112 and positioned near the through hole 113. The switch hole 54 allows the user to operate the switch directly from the outside without needing to disassemble the product. This not only makes the operation more convenient but also prevents potential damage from frequent disassembly, while simultaneously enhancing the product's waterproof and dustproof performance. By positioning the switch hole at an easily accessible location, it ensures that users can effortlessly turn the light string on or off without additional tools or performing complex operations. This design is user-friendly across all age groups. The switch hole also helps protect the internal electronic components from external environmental factors, such as moisture or dust, that might enter the device through the switch hole. Since the switch hole is located near the through hole, the internal space can be better sealed, reducing the direct impact of the external environment on the circuitry.

Furthermore, a sealing device is arranged along the circumference of the switch hole 54, which includes a rubber gasket or waterproof sealing adhesive, to prevent moisture from entering the accommodating chamber through the switch hole.

Figure 7:
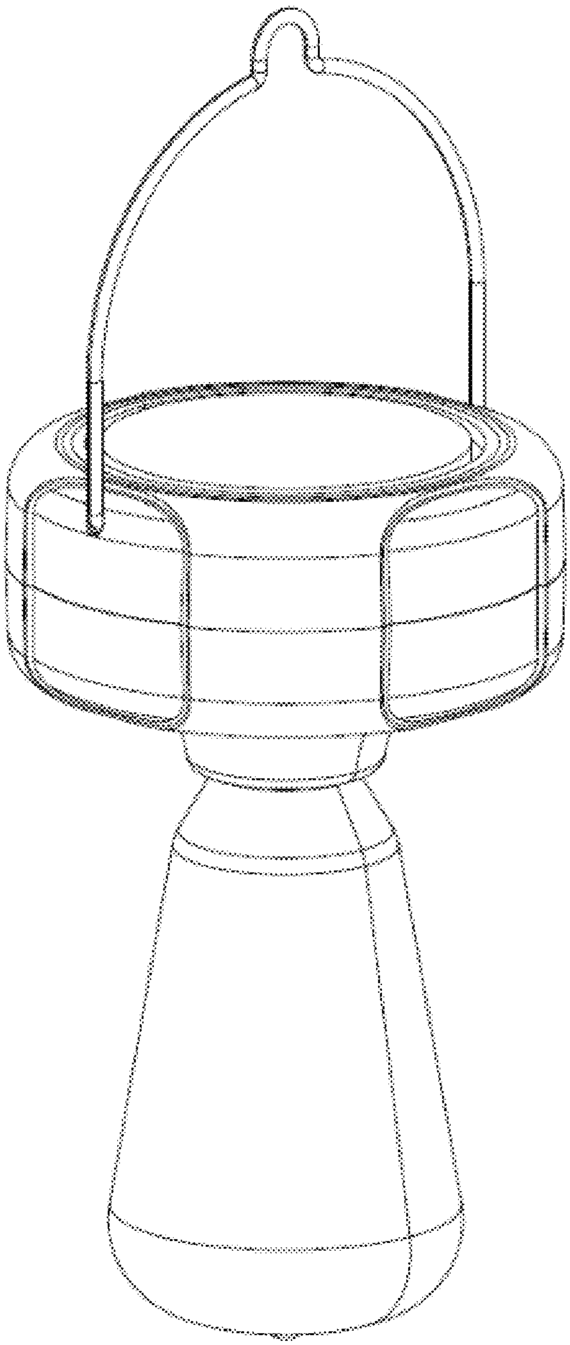
FIG. 7 shows an assembly view of the lighting device according to an embodiment of the present disclosure.

In one embodiment, please refer to FIGS. 1 to 7. FIG. 7 shows an assembly diagram of the lighting device according to the embodiment of the present disclosure. The installation steps for the lighting device provided by the present disclosure are as follows.

S1, solar panel installation: the solar panel 15 is fixed in the upper chamber 31 of the upper housing 111 by gluing, the positive and negative wires pass through the positive and negative ends of the wire outlet hole 311 into the upper chamber 31, respectively, and the remaining spaces of the positive and negative ends of the wire outlet hole 311 are sealed with adhesive for waterproofing.

S2, connection between the wires and the control module: the positive and negative wires are welded to the control module 14, such as on a printed circuit board. Other connection methods, such as riveting or male-female terminal connection, can also be used in this step to achieve an electrical connection.

S3, battery installation: the battery 16 is placed in the battery compartment 411 of the upper housing 111, ensuring that the wires inside the battery compartment 411 are properly connected to the control module 14, so that power can be transmitted from the battery to the control module 14.

S4, circuit board fixation: the circuit board 131 is placed in the lower housing 112 and secured by the circuit-board internally threaded column 514 using screws or buckles to ensure the stability of the circuit board.

S5, connection between the light strip and the circuit board: the light strip 13 is physically and electrically connected to the circuit board 131 through methods such as riveting, welding, and male and female terminals. Then, the light strip 13 and the circuit board 131 are connected to the control module 14 via wires. These wires can pass through the through hole 113 of the lower housing 112 from the interior to the exterior of the lighting device or can pass through the through hole 113 of the lower housing 112 from the exterior to the interior of the lighting device.

S6, switch installation: the switch 17 is installed into the lower housing 112 through the switch hole 54. This design allows the user to operate the switch directly without disassembling the product, increasing convenience and contributing to waterproof and dustproof performance.

S7, assembly of the upper and lower housings: the upper and lower housings are connected using the upper-lower-housing internally threaded column 511. Once the upper and lower housings are assembled together, the battery-positioning internally threaded column 512 will hold the battery and prevent it from moving inside the device.

S8, light source cover installation: the light source cover 12 snaps into the through hole 113 of the lower housing 112 from the outside and the light source cover 12 and the lower housing 112 are secured with a buckle. This design ensures the independence of the light source cover 12 from the light strip 13 and the circuit board 131, so that the rotation of the light source cover 12 does not affect the position of the light strip 13.

S9, hanging of lighting device: if hanging is required, the hanging holes 313 on two sides of the upper housing are used to engage the hook 18 for easy suspension of the lighting device.

S10, drain hole check: a drain hole 53 is provided below the mounting hole for waterproofing and drainage. During installation, it is necessary to ensure that the drain hole is not blocked and maintain its functionality.

The descriptions of the processes or structures corresponding to the above figures each have their own focus. Parts that are not detailed in one process or structure may refer to related descriptions in other processes or structures.

The above embodiments are provided merely as illustrative examples to explain the principles and effects of the present disclosure, and are not intended to limit the scope of the present disclosure. Any person skilled in the art may modify or alter the above embodiments without departing from the spirit and scope of the present disclosure. Therefore, all equivalent modifications or changes completed by those skilled in the art within the spirit and technical ideas disclosed in this application should still be covered by the claims of the present disclosure.

The invention claimed is:

1. A lighting device, comprising: a lamp holder, a light source cover, a light strip, a solar panel, and a control module;

wherein the lamp holder comprises an upper housing and a lower housing, the upper housing is adapted to the lower housing, and the upper housing and the lower housing are fixed together to form an accommodating chamber; wherein the lower housing is provided with a through hole at its bottom;

wherein the light source cover is detachably connected to the lamp holder through the through hole;

wherein a first end of the light strip is connected to a circuit board, and a second end of the light strip extends through the through hole into the interior of the light source cover; wherein the circuit board is housed within the accommodating chamber;

wherein the solar panel is fixed in a top portion of the upper housing;

wherein the control module is fixed in the accommodating chamber and is electrically connected to the solar panel and the circuit board;

wherein the upper housing comprises an upper chamber and a lower chamber;

wherein the upper chamber is provided with a wire outlet hole, which is used for leading out wires of the solar panel;

wherein the lower chamber is provided with a battery compartment and an upper-lower-chamber internally threaded column, the battery compartment is used to accommodate a battery and is connected to the control module, and the upper-lower-chamber internally threaded column is used to secure the upper and lower housings together;

wherein an inner surface at an edge of the lower chamber is provided with a downward double-step structure, wherein an upper step of the double-step structure is wider than a lower step of the double-step structure.

2. The lighting device according to claim 1, wherein a first end of the light source cover is provided with a first buckle structure, wherein an inner surface of the through hole is provided with a second buckle structure, wherein the first buckle structure is adapted to the second buckle structure to form a snap-fit connection.

3. The lighting device according to claim 1, wherein a side surface of the upper housing is provided with a first mounting hole, and the first mounting hole is used for hanging the lighting device on an external structure.

4. The lighting device according to claim 1, wherein a side surface of the upper housing is provided with at least two hanging holes, and the at least two hanging holes are used in conjunction with a mounting hole for hanging the lighting device using a hook.

5. The lighting device according to claim 1, wherein the lower housing comprises a positioning structure, a second mounting hole, a drain hole, and a switch hole;

wherein the positioning structure comprises an upper-lower-housing internally threaded column, a battery-positioning internally threaded column, a control-module internally threaded column, and a circuit-board internally threaded column; wherein the upper-lower-housing internally threaded column is used to secure the upper and lower housings together, the battery-positioning internally threaded column is used to secure a battery, the control-module internally threaded column is used to secure a control module, and the circuit-board internally threaded column is used to secure the circuit board;

wherein the second mounting hole is adapted to the first mounting hole for further installation of additional components;

wherein the drain hole is located below the second mounting hole and has a conical structure that is narrower at a top and wider at a bottom;

wherein the switch hole is positioned near the through hole and is used for installing a switch and operating it through the switch hole.

6. The lighting device according to claim 5, wherein a sealing device is provided along a circumference of the switch hole, wherein the sealing device comprises one or more of a rubber gasket and waterproof sealing adhesive.

7. The lighting device according to claim 5, wherein a lower part of the drain hole is provided with at least one drainage channel.

* * * * *